Feb. 6, 1962 T. K. CAULEY 3,020,472
APPARATUS FOR DETECTING DISCONTINUITY IN
AN ELECTRICAL CONDUCTING OBJECT
Filed Dec. 26, 1956 2 Sheets-Sheet 1

INVENTOR
THOMAS K. CAULEY,
By: Donald G. Dalton
his Attorney.

Feb. 6, 1962 T. K. CAULEY 3,020,472
APPARATUS FOR DETECTING DISCONTINUITY IN
AN ELECTRICAL CONDUCTING OBJECT
Filed Dec. 26, 1956 2 Sheets-Sheet 2
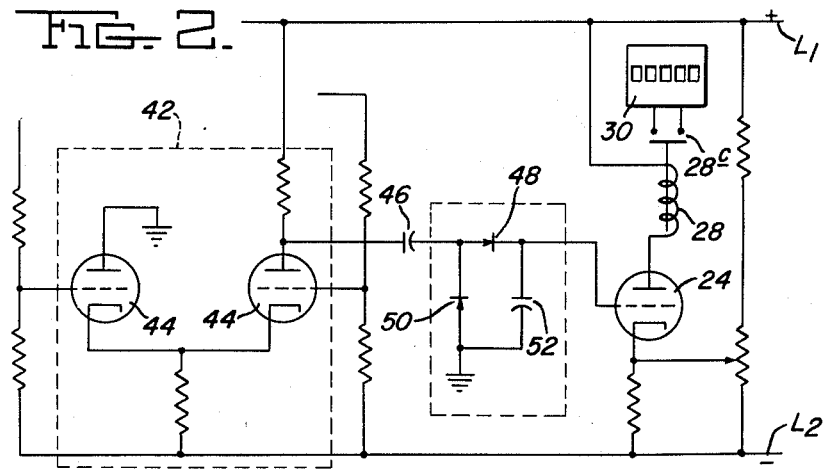
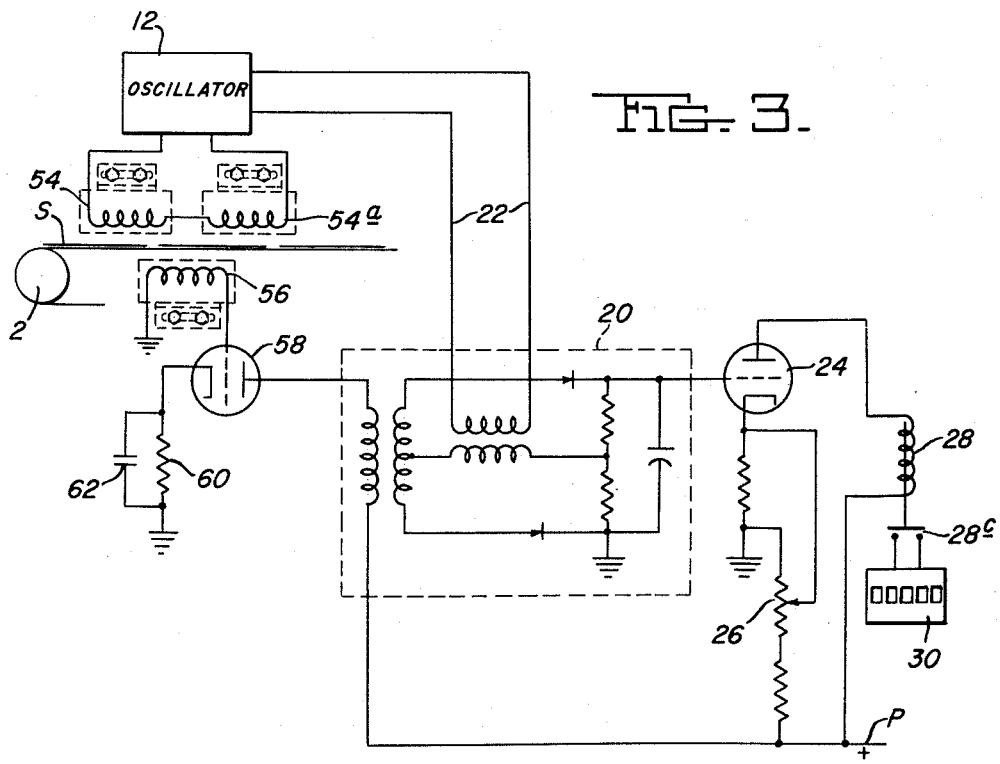
INVENTOR
THOMAS K. CAULEY,
By: Donald G. Dalton
his Attorney.

United States Patent Office 3,020,472
Patented Feb. 6, 1962

3,020,472
APPARATUS FOR DETECTING DISCONTINUITY IN AN ELECTRICAL CONDUCTING OBJECT
Thomas K. Cauley, West Mifflin, Pa., assignor to United States Steel Corporation, a corporation of New Jersey
Filed Dec. 26, 1956, Ser. No. 630,570
4 Claims. (Cl. 324—34)

This invention relates to apparatus for detecting discontinuity in an electrically conductive object and more particularly to such apparatus wherein there is relative movement between the object and the apparatus. The discontinuity may be of various types, for example, it may be the edge of a sheet, the edge of a strip, a punched hole in a sheet or strip, or a weld connecting two lengths of strip. The signal obtained may be used for various purposes such as counting sheets, operating a device to warn of a defect or operating a throw out device. Various types of apparatus have previously been used for detecting discontinuity. Photocell systems are commonly used for the counting and sorting of metal sheets but such systems have the disadvantage that dust, vapor clouds or grease film form between the phototube and light source, thus weakening or blocking out the light rays. This reduces the sensitivity so that the photocell system may operate either intermittently or not at all. Radiation devices have also been used but they are costly, complex and large. Electromagnetic means also have been used, but those in use do not operate satisfactorily because variations in gap between the electromagnet and sheets due to vibration of the sheet or other causes effects the sensitivity and accuracy of the device.

It is therefore an object of my invention to provide discontinuity detecting apparatus which is relatively inexpensive, rugged, sensitive and yet not affected by vibrations or variations in outside conditions.

This and other objects will be more apparent after referring to the following specification and attached drawings, in which:

FIG. 2 is a fragmentary electrical diagram showing a modification of the circuit of FIGURE 1; and FIGURE 3 is an electrical diagram showing another embodiment of my invention.

Figure 1:
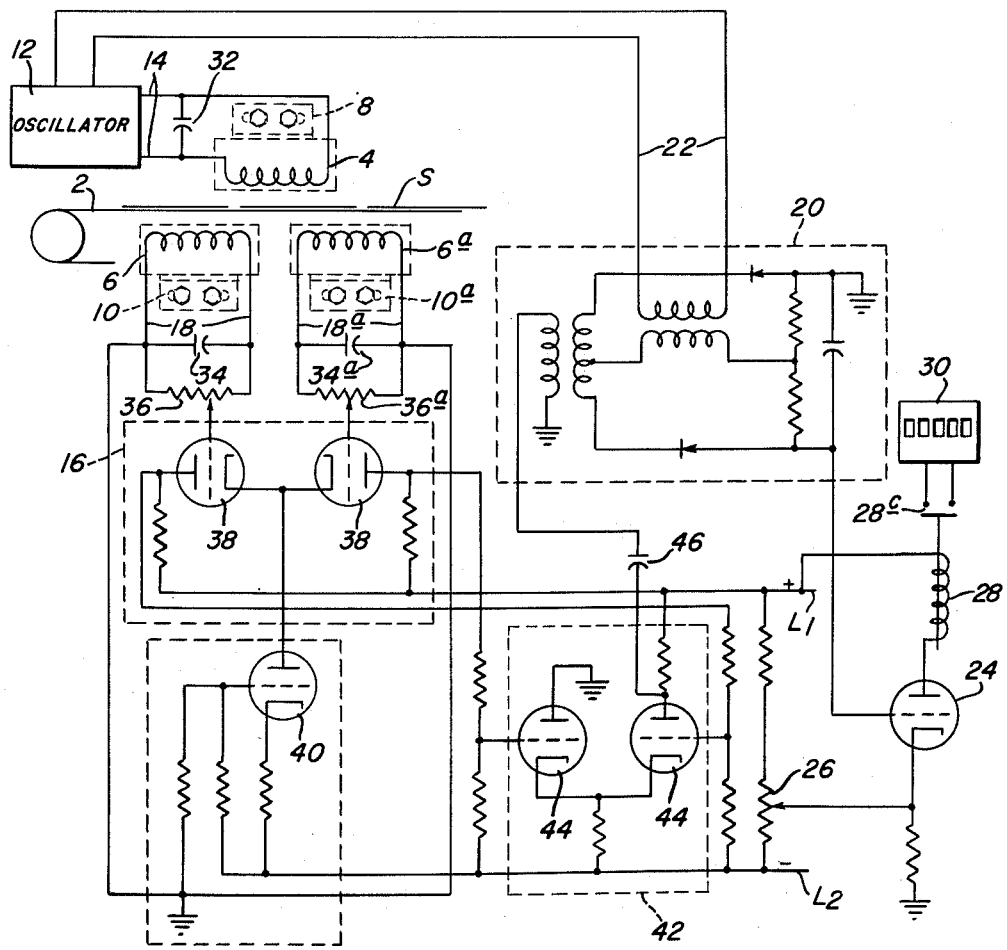
FIGURE 1 is an electrical diagram showing one embodiment of my device.

Referring more particularly to FIGURE 1 of the drawings, the reference numeral 2 indicates a belt conveyor for conveying sheets S. Located on one side of the path of travel of sheets S is a transmitter coil 4 and located on the opposite side of the path of travel of sheets S are a pair of receiver coils 6 and 6a, located in a plane parallel to the path of travel of sheets S. This arrangement is suitable when using the apparatus to count the number of sheets since the traveling sheets S will shield the receiver coils in sequence, this being necessary in this case to the proper functioning of the device. The arrangement for a sheet counter will be described but it will be understood that the device might be used for other purposes in which case the position of coils 6 and 6a may be varied. For this reason the transmitter coil 4 is mounted on an adjustable bracket 8 and the receiver coils 6 and 6a are mounted on adjustable brackets 10 and 10a. The coils 4, 6 and 6a with or without other apparatus to be described hereinafter may be placed in a stainless steel box or may be exposed. However, the coils must not be shielded so as to weaken their fields. The center coil 4 is connected to an oscillator 12 by means of leads 14. As shown in FIGURE 1, the receiver coils 6 and 6a are connected to a difference amplifier 16 by means of leads 18 and 18a. The output of the amplifier 16 is directly or indirectly connected to a discriminator 20 which also is connected by means of leads 22 to the oscillator 12. The output of discriminator 20 is connected to the grid of a tube 24. A relay coil 28 is connected to the plate of tube 24 and is provided with contacts 28c for operating a counter 30. The oscillator 12 is a conventional low frequency oscillator operating at about 15,000 cycles per second. Choice of power and frequency of operation of the oscillator is not critical. If desired, tuned coils may be used for which purpose a condenser 32 is connected across the leads 14 and condensers 34 and 34a are connected across the leads 18 and 18a, respectively. In case of tuned coils the frequency of operation of oscillator 12 must be relatively stable with time, variations in supply voltage and temperature. Most standard oscillator circuits will meet these requirements. Potentiometers 36 and 36a are connected across the leads 18 and 18a for a purpose which will appear later. The difference amplifier 16 may be dual triode discriminator such as shown on page 444 of Vacuum Tube Amplifiers, Valley and Wallman, McGraw-Hill Book Company (New York 1948). This consists of two triodes 38 having a constant cathode load applied through a triode 40. The output of discriminator amplifier 16 may be connected and further amplified by a standard dual triode amplifier 42 consisting of two triodes 44 connected as shown. The output of amplifier 42 is connected through a condenser 46 to the discriminator 20 which may be of a well known type such as that described on page 368 of Active Networks, Prentice-Hall, New York 1954. Direct current is supplied to the system through leads L1 and L2. A single amplifier tube, such as shown in FIGURE 3 may be substituted for the amplifiers shown.

The operation of the device of FIGURE 1 is as follows:

In case the system is not balanced through the symmetry of parts and mechanical arrangements potentiometers 36 and 36a are adjusted to balance the system electrically. The potentiometer 26 provides the means for controlling sensitivity of the system by varying the fixed bias on the relay tube 24. The circulating currents passing through coil 4 produce an alternating magnetic field that centers over receiver coils 6 and 6a, thus inducing equal voltages into the coils 6 and 6a. These voltages are applied to the amplifier 16. When there is no sheet in the system the output of amplifier 16 will be zero. When the end of a sheet S passes near center coil 4 the receiver coils are shielded in sequence and an unbalanced voltage occurs at amplifier 16. In other words, the sheet S first influences the magnetic coupling between coil 4 and coil 6 and then the magnetic coupling between coil 4 and coil 6a so that a signal is obtained from the receiver circuit when a discontinuity as indicated by the leading or trailing edge of the sheet occurs. This difference in voltage is amplified in dual triode amplifier 16 and further amplified in amplifier 42. This amplified signal is applied to the discriminator 20 which compares the signal with the signal from the oscillator 12 to determine the direction of unbalance. Since there is a 180° phase difference between the signals due to the head and tail ends the discriminator 20 will cause tube 24 to conduct at one end but not at the other, depending upon the bias on tube 24. Firing of the tube 24 energizes relay coil 28 closing its contacts 28C to operate counter 30.

FIGURE 2 shows a modification wherein the discriminator 20 is omitted and the output from amplifier 42 is connected through the condenser 46 and a rectifier 48 to the tube 24. A second rectifier 50 and a condenser 52 are connected in circuit with rectifier 48. The other parts of this circuit are the same as that shown in FIGURE 1. With this circuit the tube 24 will conduct twice for each sheet, once for the forward end and once for the trailing end. Thus, when used with the counter 32 it will be necessary to divide the count by half. While the coils 4, 6 and 6a are shown as single coils they may be replaced by a configuration of coils when deemed necessary. Transistor and magnetic amplifier circuits may be substituted for those amplifier circuits shown. The output of coils 6 and 6a may be compared directly by connecting them in circuit with a relay coil having sufficient sensitivity for a particular purpose.

In the embodiment shown in FIGURE 3 two transmitter coils 54 and 54a are used and only one receiver coil 56 is used. Like in the first embodiment the oscillator 12 is connected by means of leads 22 to the discriminator 20. The coil 56 is connected to the grid of a triode amplifier tube 58. The cathode of tube 58 is connected to ground through a resistor 60 and condenser 62 connected in parallel. The output of tube 58 is connected to the discriminator 20. The output of discriminator 20 is connected to the grid of tube 24 with the other connections being the same as in FIGURES 1 and 2. A positive direct current is supplied to the system by lead P. The operation of this embodiment is similar to that of FIGURE 1 in that the discontinuity first influences the magnetic coupling between coils 54 and 56 and then the magnetic coupling between coils 54 and 56a. This develops a signal which is amplified by tube 58. The amplified signal is applied to discriminator 20 which compares the signal with the signal from oscillator 12 to determine the direction of unbalance. The counter 30 is then operated as in FIGURE 1.

While several embodiment of my invention have been shown and described it will be apparent that other adaptations and modifications may be made without departing from the scope of the following claims.

I claim:
1. Apparatus for counting moving objects made of electrical conducting material which comprises a transmitter circuit, a receiver circuit adjacent said transmitter circuit, a first coil in one of said circuits, second and third coils in the other of said circuits, the second and third coils being so arranged that each of said objects will influence the magnetic coupling between the first and second coils and the magnetic coupling between the first and third coils in sequence, means for moving said objects past the second and third coils in sequence, means for obtaining a signal from said receiver circuit when the leading edge of each object passes adjacent thereto, means for obtaining a signal from said receiver circuit when the trailing edge of each object passes adjacent thereto, a counter, and means for impressing the signals from only one of said edges on said counter.

2. Apparatus for counting moving objects made of electrical conducting material which comprises a transmitter circuit, a receiver circuit adjacent said transmitter circuit, a first coil in one of said circuits, second and third coils in the other of said circuits, the second and third coils being so arranged that each of said objects will influence the magnetic coupling between the first and second coils and the magnetic coupling between the first and third coils in sequence, means for moving said objects past the second and third coils in sequence, an oscillator in said transmitter circuit, a phase discriminator, means connecting said oscillator to said discriminator, means connecting said receiver circuit to said discriminator, said discriminator generating an output signal of one polarity when the leading edge of each object passes adjacent said coils and an output signal of opposite polarity when the trailing edge of each object passes adjacent said coils, a counter, and means permitting passage of signals of only one polarity from said discriminator to said counter.

3. Apparatus for counting moving objects made of electrical conducting material which comprises a transmitter coil, an oscillator, leads connecting said oscillator to said transmitter coil, two receiver coils arranged adjacent the transmitter coil so that each of said objects will shield the receiver coils in sequence, means for moving said objects past the receiver coils in sequence, a difference amplifier for comparing the outputs of said receiver coils and amplifying any difference, said difference amplifier including means for balancing the input signal thereto when no object is present, leads from each of said receiver coils to said difference amplifier, a phase discriminator, means connecting the output of said amplifier to said phase discriminator, leads connecting said discriminator to said oscillator, said discriminator generating an output signal of one polarity when the leading edge of each object passes adjacent said coils and an output signal of opposite polarity when the trailing edge of each object passes adjacent said coils, a counter, and means permitting passage of signals of only one polarity from said discriminator to said counter.

4. Apparatus for counting moving objects made of electrical conducting material which comprises a transmitter circuit, a receiver circuit adjacent said transmitter circuit, a first coil in one of said circuits, second and third coils in the other of said circuits, the second and third coils being so arranged that each of said objects will influence the magnetic coupling between the first and second coils and the magnetic coupling between the first and third coils in sequence, means for moving said objects past the second and third coils in sequence, an oscillator in said transmitter circuit, a phase discriminator, means connecting said oscillator to said discriminator, means connecting said receiver circuit to said discriminator, said discriminator generating an output signal of one polarity when the leading edge of each object passes adjacent said coils and an output signal of opposite polarity when the trailing edge of each object passes adjacent said coils, a counter, a triode tube having a grid, plate and cathode, and means connecting the output of said discriminator to said tube, said triode tube being so biased as to permit passage of signals of only one polarity from said discriminator to said counter.

References Cited in the file of this patent
UNITED STATES PATENTS

| | | |
|---|---|---|
| 2,065,118 | Davis | Dec. 22, 1936 |
| 2,124,579 | Knerr et al. | July 26, 1938 |
| 2,189,092 | Urmenyi | Feb. 6, 1940 |
| 2,455,792 | Meunier | Dec. 7, 1948 |
| 2,594,947 | Lynch | Apr. 29, 1952 |
| 2,751,150 | Buccicone | June 19, 1956 |
| 2,753,520 | Doll | July 3, 1956 |
| 2,918,621 | Callan et al. | Dec. 22, 1959 |